United States Patent

Burdeska et al.

[11] 4,033,965
[45] July 5, 1977

[54] NITRO ACRIDONE DYES

[75] Inventors: Kurt Burdeska, Basel; Hansrudolf Schwander, Riehen;, both of Switzerland

[73] Assignee: Ciba-Geigy Corporation, Ardsley, N.Y.

[22] Filed: Apr. 16, 1975

[21] Appl. No.: 568,767

[30] Foreign Application Priority Data

Apr. 17, 1974 Switzerland .................. 5287/74
Nov. 19, 1974 Switzerland .................. 15367/74

[52] U.S. Cl. .................. 260/279 R; 8/54.2; 8/25; 8/178 R; 8/179
[51] Int. Cl.² .................. C09B 15/00; C07D 219/08
[58] Field of Search .................. 260/279 R

[56] References Cited

UNITED STATES PATENTS

| | | | |
|---|---|---|---|
| 3,541,099 | 11/1970 | Burdeska et al. | 260/279 R |
| 3,624,255 | 11/1971 | Burdeska et al. | 260/279 R |
| 3,975,150 | 8/1976 | Brack | 8/2.5 R |

FOREIGN PATENTS OR APPLICATIONS 1,509,386  11/1967  France

OTHER PUBLICATIONS

Burdeska et al., Chemical Abstracts, vol. 78, 17,591b (1973).

Burdeska et al., Helv. Chim. Acta., 55, pp. 1948–1958 (1972).

*Primary Examiner*—Donald G. Daus
*Assistant Examiner*—Diana G. Rivers
*Attorney, Agent, or Firm*—Karl F. Jorda; Edward McC. Roberts; Prabodh I. Almaula

[57] ABSTRACT

A disperse dye which contains no water-solubilizing groups, of the formula

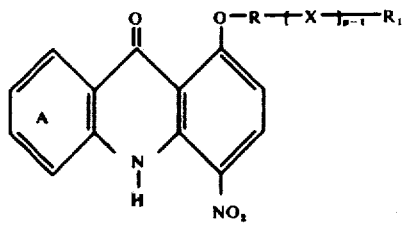

wherein $p$ is 1 or 2, R is a straight-chain alkylene radical which may be interrupted by sulphur oxygen atoms or a branched alkylene radical which is unsubstituted or substituted by hydroxy groups, $R_1$ is an aryl group which is substituted or unsubstituted or a benzyl radical which is substituted or unsubstituted, X is an oxygen or a sulphur atom, the rings A and B can carry further non-ionic substituents, and the ring A can carry a further fused benzo ring.

10 Claims, No Drawings

NITRO ACRIDONE DYES

The present invention relates to new nitro dyes of the acridone class, to a process for their manufacture, to their use for dyeing organic material, especially to the use of those nitroacridone dyes which are sparingly soluble in water for dyeing hydrophobic organic fibrous material in aqueous, finely disperse suspensions, as well as to the material, in the form of an industrial product, which is dyed with the new nitro dyes.

The invention therefore provides new dyes which contain no water-solubilising groups, of the formula I

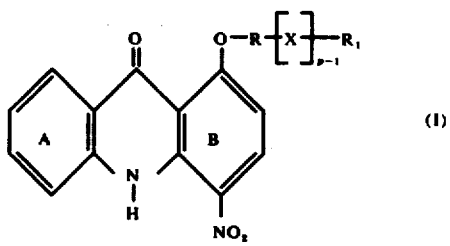

(I)

wherein R is a straight-chain alkylene radical which may be interrupted by sulphur or oxygen atoms or a branched alkylene radical which is unsubstituted or substituted by hydroxy groups, $R_1$ is an aryl group which is substituted or unsubstituted or a benzyl radical which is substituted or unsubstituted, X is an oxygen or a sulphur atom, the rings A and B can carry further non-ionic substituents, and the ring A can carry a fused benzo ring, and $p$ is 1 or 2.

The new dyes are obtained by reacting an acridone compound of the formula II

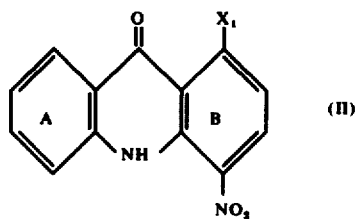

(II)

wherein $X_1$ is a mobile substituent which makes the nucleophilic substitution possible and wherein the rings A and B can be further substituted and the ring A can be condensed with a further ring, with a hydroxy compound of the formula III

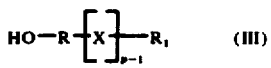

(III)

wherein $p$, R, $R_1$ and X have the meanings assigned to them hereinbefore, optionally in the presence of an acid acceptor, or with a metal salt of a hydroxy compound of the formula III, to give a nitroacridone dye of the formula I.

The compounds according to the invention contain in particular no substituents which form water-soluble anions that exhibit acid dissociation in water, for example the sulphonic acid, carboxylic acid or phosphoric acid group.

In the formula II, $X_1$ is preferably fluorine, chlorine or bromine. But $X_1$ can also be the nitro group or a lower alkoxy group, such as the methoxy or ethoxy group.

Examples of radicals R are, for example, straight-chain or branched alkylene groups of up to 4 carbon atoms which are unsubstituted or substituted by hydroxy groups. Examples of suitable groups are —CH$_2$—CH$_2$, —CH$_2$—CH$_2$—CH$_2$—, CH$_2$—CH$_2$—CH$_2$—CH$_2$—, —CH$_2$—CH$_2$—O—CH$_2$—CH$_2$, —CH$_2$—CH$_2$—O—CH$_2$—CH$_2$—CH$_2$—, —CH$_2$—CH$_2$—S—CH$_2$—CH$_2$—,

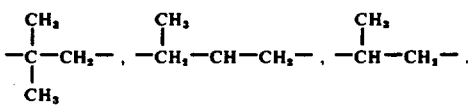

Groups of the formula —(CH$_2$)$_{2-4}$ are preferred.

Suitable aryl radicals $R_1$ are preferably unsubstituted or substituted phenyl radicals which can have the substituents listed hereinafter.

The benzyl radicals which are also suitable as $R_1$ can possess the substituents listed hereinafter, with the exception of the fused benzene residues.

All carbocyclic-aromatic rings of the nitroacridone dyes of the formula I can obtain the substituents which are customary in dyes, for example halogens, such as fluorine, chlorine or bromine; alkyl groups, preferably lower alkyl groups of up to 4 carbon atoms, such as methyl, ethyl, propyl, isopropyl, butyl, isobutyl, tert. butyl, isoamyl and tert. amyl radicals, but also higher alkyl groups; mononuclear aryl groups, such as the phenyl or p-methylphenyl group; alkoxy groups, such as the methoxy or ethoxy group; alkylthio groups, such as the methylthio or ethylthio group; mononuclear aryloxy or arylthio groups, such as the phenoxy or phenylthio group; acyl groups, for example hydrocarbon sulphonyl groups, such as lower alkylsulphonyl or phenylsulphonyl groups, also lower carbalkoxy groups; carboxylic acid or sulphonic acid groups; carboxylic or sulphonic acid amide groups which are derived from ammonia or primary or secondary organic amines, such as carboxylic and sulphonic acid-N-mono- or -N,N-di-lower alkyl amide group; primary, secondary and tertiary amino groups, wherein as substituents or primary and secondary amino groups preferably lower alkyl groups are suitable; in addition acylamino groups, especially lower alkanoylamino or mononuclear aroylamino groups and furthermore the nitro, cyano or trifluoromethyl group.

If the ring A is further condensed, then it contains primarily benzo radicals. For example in 7,8-position the ring A can contain a benzo radical. The ring A is substituted with advantage or it contains a lower alkyl group, for example the methyl or ethyl group, or an alkoxy group, for example the methoxy or ethoxy group, or halogen, such as chlorine or bromine. The ring B can contain as substituents above all alkoxy radicals, such as methoxy, and halogen, such as chlorine, especially in the 2-position. However, the ring B is primarily unsubstituted.

If $R_1$ is a substituted phenyl radical, the preferred substituents of those listed hereinbefore are: chlorine atoms, methoxy, ethoxy, methyl, ethyl, propyl, isopropyl, butyl, isobutyl, tert. butyl, phenyl and trifluoromethyl groups.

The ring A can contain as preferred substituents: chlorine and bromine atoms, methyl, ethyl, isopropyl, tert. butyl, phenyl, methoxy, ethoxy, phenoxy, methylmercapto, acetamido, nitro and benzo radicals (these latter in 6,7- or 7,8-position).

The reaction of the acridone compound of the formula II with the hydroxy compound of the formula III takes place, for example, in the melt in a surplus of hydroxy compound or in an aqueous, organic or organic-aqueous solution or dispersion. Examples of suitable organic solvents are: aromatic hydrocarbons such as toluene or xylene; aromatic halogenated hydrocarbons, for example chlorobenzene; aliphatic ketones, such as methyl ethyl ketone or methyl isobutyl ketone; cyclic ethers, e.g., dioxan; amides of lower fatty acids, especially dimethyl formamide; or dialkyl sulphoxides, such as dimethyl sulphoxide. It is advisable to use an alkali metal salt, especially the sodium or potassium salt, of the hydroxy compound of the formula III as starting material, or to use simultaneously agents which give an alkaline reaction, in which case in particular alkali metal carbonates, such as sodium or potassium carbonate or alkali metal hydroxides, preferably sodium or potassium hydroxide, in addition also magnesium oxide or tertiary nitrogen basis, e.g. pyridine, are suitable. The reaction takes place in dimethyl sulphoxide at room temperature; but in all other cosolvents an elevated temperature of e.g. 80°–140° C is indicated.

The new nitro dyes of the acridone class, which contain no water-solubilising groups which exhibit acid dissociation in water, are suitable for dyeing hydrophobic, synthetic organic fibrous material, for example for dyeing textile material consisting of high-molecular weight organic esters, for example cellulose di- or triacetate, and for dyeing textile material made from polymeric esters of aromatic polycarboxylic acids with polyhydric alcohols, above all from polyethylene glycol terephthalate or polycyclohexanediol terephthalate. These dyes can be used as well for dyeing synthetic polyamide fibres, for example those derived from polyhexamethylene adipic amide, polycaprolactam or polyundecanoic acid, as well as for dyeing polyolefins, especially polypropylene fibres. Furthermore, depending on their composition, they are suitable for colouring or pigmenting lacquers, oils and waxes, as well as the dope dyeing of cellulose derivatives, especially cellulose esters, e.g. cellulose acetate, since many nitroacridone dyes according to the invention are soluble in a number of conventional organic solvents, e.g. in acetone or methyl ethyl ketone. The dyes are particularly suitable for dyeing polyester fibres from organic solvents.

Preferably, the dyeing of the fibrous materials cited hereinbefore with the nitroacridone dyes which are sparingly soluble in water is effected from an aqueous dispersion. It is therefore desirable to comminute the disperse dyes of the formula I finely by grinding them with dispersants and possibly other grinding assistants, so that dyestuff preparations are obtained.

Examples of suitable anionic dispersants for this purpose are the alkylarylsulphonates, the condensation products of formaldehyde with naphthalenesulphonic acid, the lignin sulphonates; and suitable non-ionic dispersants are the fatty alcohol or alkylphenol polyglycol ethers with higher alkyl radical.

The dyeing of the polyester fibres with the dyes according to the invention which are sparingly soluble in water from an aqueous dispersion is effected by the methods which are customary for dyeing polyester materials. Polyesters of aromatic polycarboxylic acids with polyhydric alcohols are dyed preferably at temperatures of over 100° C under pressure. However, the dyeing can also be carried out at the boiling point of the dyebath in the presence of dye carriers, for example alkali metal phenyl-phenolates, polychlorobenzene compounds or similar assistants, or by the pad process and subsequent aftertreatment at elevated temperature, for example thermofixing at 180°–210° C. Cellulose diacetate fibres, for which the dyes according to the invention have a particularly good affinity, are preferably dyed at temperatures of 80°–85° C, whereas cellulose triacetate fibres are dyed with advantage at the boiling point of the dyebath. The use of dye carriers is superfluous when dyeing the last mentioned types of fibre. Nitroacridone dyes according to the invention can also be used for printing the cited materials by conventional methods.

The disperse dyes of the formula I exhaust onto the hydrophobic organic fibrous material, especially onto polyethylene glycol terephthalate fibres, very well and produce on this fibrous material strong yellow to orange dyeings of very good fastness to light, washing, fulling, rubbing, perspiration, sublimation, solvents and decatising. In organic solvents, for example in dimethyl formamide, they also possess a high molar extinction. A further advantage of the new nitroacridone dyes is that they can be readily combined with blue anthraquinone dyes. In brown dyestuff combinations they exhibit pronounced colour strengths.

The following Examples illustrate the invention.

EXAMPLE 1

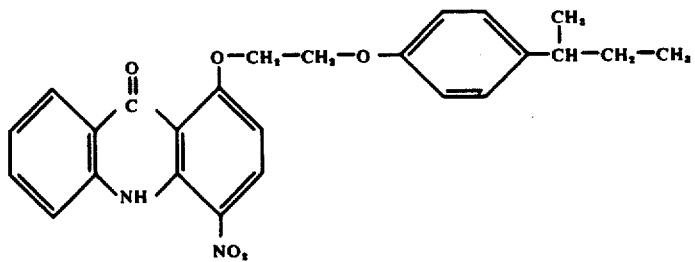

13.75 g of 1-chloro-4-nitro-acridone are added at room temperature to a solution of 1.54 g of sodium in 130 ml of 2-(4-sec. butyl-phenoxy)-ethanol. The resultant red suspension is heated within 20 minutes to 90°–95° C and stirred for 3 hours at this temperature. The resultant yellow solution is then poured with good stirring into a mixture of 150 ml of ethanol and 20 ml of glacial acetic acid, whereupon the yellow dye of the above formula precipitates. The batch is again heated to the boil and filtered hot after being boiled for 5 minutes. The yellow dye is washed with alcohol and water and dried in vacuo at 100° C. The yield is 16.9 g. The product can be purified by recrystallising it from chlorobenzene.

After it has been ground with the sodium salt of the condensation products of napthalene-2-sulphonic acid with formaldehyde in the presence of sodium orthophenylphenolate as swelling agent, the resultant nitro dye colours polyethylene glycol terephthalate fibres in greenish yellow shades of very good fastness to washing, rubbing, light, and sublimation.

End products which dye polyethylene glycol terephthalate fibres in the fast shades listed in Table 1 are obtained by using equal amounts of one of the 2-phenoxy-ethanols listed in column 2 of the Table instead of the 130 ml of 2-(4-sec. butyl-phenoxy)-ethanol and otherwise carrying out the same procedure.

Table 1

| No. | 2-phenoxy-ethanol | Shade on polyethylene glycol terephthalate fibres |
|---|---|---|
| 1. | HO—CH$_2$—CH$_2$—O—C$_6$H$_4$(2-CH$_3$) | greenish yellow |
| 2. | HO—CH$_2$—CH$_2$—O—C$_6$H$_4$(3-CH$_3$) | " |
| 3. | HO—CH$_2$—CH$_2$—O—C$_6$H$_4$(4-CH$_3$) | " |
| 4. | HO—CH$_2$—CH$_2$—O—C$_6$H$_3$(2,4-(CH$_3$)$_2$) | " |
| 5. | HO—CH$_2$—CH$_2$—O—C$_6$H$_3$(3,4-(CH$_3$)$_2$) | " |
| 6. | HO—CH$_2$—CH$_2$—O—C$_6$H$_3$(3-CH$_3$,4-Cl) | " |
| 7. | HO—CH$_2$—CH$_2$—O—C$_6$H$_4$(C$_2$H$_5$) | " |
| 8. | HO—CH$_2$—CH$_2$—O—C$_6$H$_4$(CH(CH$_3$)$_2$) | " |
| 9. | HO—CH$_2$—CH$_2$—O—C$_6$H$_4$(C(CH$_3$)$_3$) | " |
| 10. | HO—CH$_2$—CH$_2$—O—C$_6$H$_4$(CH(CH$_3$)—CH$_2$—CH$_3$) | " |
| 11. | HO—CH$_2$—CH$_2$—O—C$_6$H$_3$(C(CH$_3$)$_3$, CH$_2$—CH(CH$_2$—CH$_3$)$_2$) | " |
| 12. | HO—CH$_2$—CH$_2$—O—C$_6$H$_4$—tert.amyl | " |
| 13. | HO—CH$_2$—CH$_2$—O—C$_6$H$_4$—Cl | " |

| No. | 2-phenoxy-ethanol | Shade on polyethylene glycol terephthalate fibres |
|---|---|---|
| 14. | HO—CH₂—CH₂—O—C₆H₄—Cl | ″ |
| 15. | HO—CH₂—CH₂—O—C₆H₄(OCH₃) (meta) | ″ |
| 16. | HO—CH₂—CH₂—O—C₆H₄—OCH₃ | ″ |
| 17. | HO—CH₂—CH₂—O—C₆H₄—C₆H₅ | ″ |
| 18. | HO—CH₂—CH₂—O—C₆H₄(CF₃) (meta) | ″ |

EXAMPLE 2

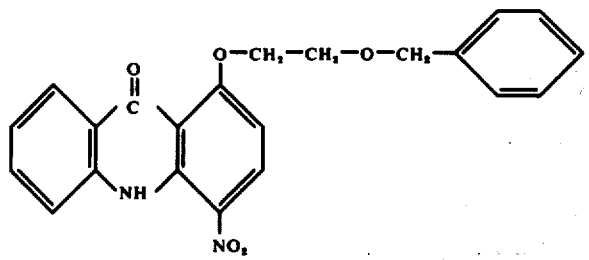

21.1 g of a 30.7% sodium methylate solution are mixed with 80 ml of 2-benzyloxy-ethanol and the mixture is heated to the boil with stirring. After the methyl alcohol has been distilled off, the mixture is heated to 100° C and stirred for 3 hours at this temperature in vacuo. After the batch has been cooled to room temperature, another 60 ml of 2-benzyloxyethanol and then 16.5 g of 1-chloro-4-nitro-acridone are added. A yellowish red suspension forms and this is heated to 90°-95° C and stirred for 1½ hours at this temperature. After the batch has been cooled to room temperature, the precipitated yellow dye is filtered off, washed first with 2-benzyloxyethanol, then with alcohol and water and dried in vacuo at 100° C. Yield: 17.3 g. The dye can be further purified by recrystallisation from benzene.

In aqueous dispersion in the presence of sodium ortho-phenylphenolate, this dye colours polyethylene glycol terephthalate fibres in greenish yellow shades of very good fastness to washing, rubbing, light and sublimation.

EXAMPLE 3

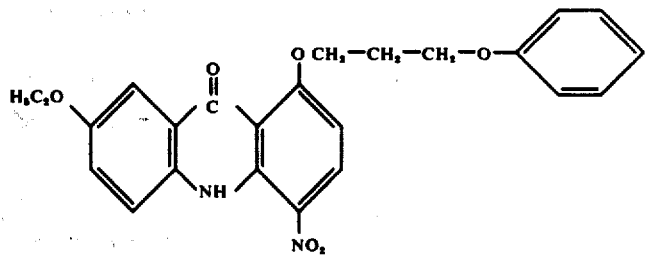

12.76 g of 1-chloro-4-nitro-7-ethoxy-acridone are added at room temperature to a solution of 1.23 g of sodium in 100 ml of 3-phenoxy-propanol. With good stirring, the mixture is heated to 90°-95° C and stirred for 2 hours at this temperature. The resultant red solution is poured with good stirring into 500 ml of alcohol, whereupon the orange red dye precipitates. The batch is well stirred for a further 5 minutes and then filtered. The dye is washed with alcohol and water and dried in vacuo at 80° C. Yield: 16.8 g.

The dye is obtained in orange crystals by recrystallisation from benzene. In aqueous dispersion in the presence of sodium ortho-phenylphenolate, this dye colours polyethylene glycol terephthalate fibres in golden yellow shades of very good fastness to washing, rubbing, light and sublimation.

End products which dye polyethylene glycol terephthalate fibres in the fast shades listed in column 3 of Table II are obtained by using the equimolar amount of a 1-chloro-4-nitro-acridone listed in column 2 of the Table instead of the 12.76 g of 1-chloro-4-nitro-7-ethoxy-acridone and otherwise carrying out the same procedure.

Table II

| No. | 1-chloro-4-nitro-acridone | Shade on polyethylene glacol terephthalate fibres |
|---|---|---|
| 1. | 1-chloro-4-nitro-7- | reddish yellow |

Table II-continued

| No. | 1-chloro-4-nitro-acridone | Shade on polyethylene glycol terephthalate fibres |
|---|---|---|
| | methylacridone | |
| 2. | 1-chloro-4-nitro-6-chloro-acridone | greenish yellow |
| 3. | 1-chloro-4-nitro-6-methoxy-acridone | '' |
| 4. | 1-chloro-4-nitro-8-methoxy-acridone | reddish yellow |
| 5. | 1-chloro-4-nitro-5-methyl-acridone | '' |
| 6. | 1-chloro-4-nitro-7-phenoxy-acridone | '' |
| 7. | 1-chloro-4-nitro-7-methylmercapto-acridone | '' |
| 8. | 1-chloro-4-nitro-7-iso-propyl-acridone | '' |
| 9. | 1-chloro-4-nitro-7,8-benzacridone | '' |
| 10. | 1-chloro-4-nitro-7-phenyl-acridone | '' |
| 11. | 1-chloro-4-nitro-7-ethyl-acridone | '' |
| 12. | 1-chloro-4-nitro-7-tert.butyl-acridone | '' |
| 13. | 1-chloro-4-nitro-6-methyl-acridone | greenish yellow |
| 14. | 1,2-dichloro-4-nitro-acridone | reddish yellow |
| 15. | 1-chloro-2-methoxy-4-nitro-acridone | orange |
| 16. | 1-chloro-4-nitro-7-acetylamino-acridone | reddish yellow |
| 17. | 1-chloro-4,7-dinitro-acridone | greenish yellow |
| 18. | 1,2,6-trichloro-4-nitro-acridone | reddish yellow |
| 19. | 1,2,7-trichloro-4-nitro-acridone | '' |
| 20. | 1,2,6-trichloro-4-nitro-acridone | '' |
| 21. | 1,2-dichloro-7-methyl-4-nitro-acridone | '' |
| 22. | 1-chloro-6,7-benzo-4-nitro-acridone | '' |

EXAMPLE 4

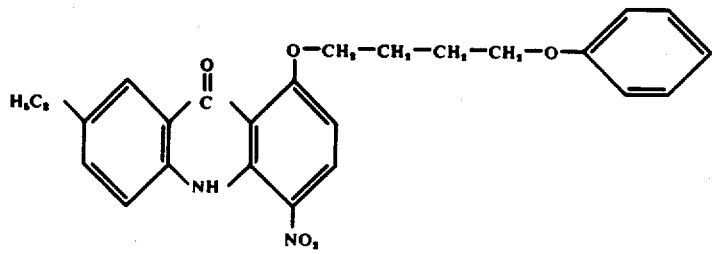

1.23 g of sodium and 110 ml of 4-phenoxybutanol are stirred under nitrogen overnight at 60°-70° C. Then 12.12 g of 1-chloro-4-nitro-7-ethyl-acridone are added to the solution, which has been cooled to room temperature. The mixture is then heated to 90°-95° C and stirred for 4½ hours at this temperature. After it has been cooled to 50° C, the mixture is poured into 400 ml of ethanol to which 5 ml of glacial acetic acid have been added. The precipitated dye is filtered, washed with alcohol and water and dried in vacuo at 100° C. Yield: 15 g. The dye of the above formula crystallises from glacial acetic acid in yellow crystals.

The above dye (2 g) is brought into a finely dispersible form by grinding it with 6 parts by weight of a lignin sulphonate. Polyethylene glycol terephthalate fibres are dyed with this dyeing preparation in aqueous dispersion, in the presence of sodium ortho-phenylphenolate, in yellow shades. The dyeings are of very good fastness to light, washing, rubbing and sublimation.

A yellow dye of similarly good fastness properties is also obtained by using the same amount of 3-benzyloxy-propanol instead of the 110 ml of 4-phenoxybutanol and otherwise carrying out the same procedure.

EXAMPLE 5

9.92 g of a 30.7% sodium methylate solution are mixed with 80 ml of 3-phenylmercapto-propanol and 10 ml of methanol and the mixture is heated with stirring to the boil. After the methanol has been distilled off, the mixture is heated to 100° C and stirred for 3 hours at this temperature in vacuo. After the mixture has been cooled to room temperature, it is diluted with 40 ml of 3-phenylmercapto-propanol and, with good stirring, 13 g of 1-chloro-4-nitro-acridone are added to the mixture. After it has been cooled to room temperature, the reaction mixture is poured into 400 ml of ethanol, whereupon the dye of the above formula precipitates. Upon addition of 5 ml of glacial acetic acid, the bath is thoroughly stirred for 15 minutes and then the product is filtered off. The product is washed with alcohol and water and dried in vacuo at 100° C. Yield: 17 g. The product crystallises from chlorobenzene in yellow crystals.

After it has been ground with the sodium salt of a condensation product of naphthalene-2-sulphonic acid with formaldehyde, the dye obtained in this Example dyes polyethylene glycol terephthalate fibres, in the presence of sodium ortho-phenylphenolate, in greenish yellow shades. The dyeings are of very good fastness to washing, rubbing, light and sublimation.

Yellow dyes of equally good fastness properties are also obtained by substituting equal amounts of 3-benzylmercaptopropanol or 2-benzylmercapto-ethanol or 2-phenylmercaptoethanol for the 120 ml of 3-phenylmercapto-propanol and otherwise carrying out the same procedure as in the example.

EXAMPLE 6

16.5 g of 1-chloro-4-nitroacridone are added at room temperature to a solution of 1.85 g of sodium in 140 ml of 2-phenylethyl alcohol. The resultant solution is then heated to 90° to 95° C over the course of 30 minutes and stirred for a further 2 hours at this temperature. After the mixture has been cooled to room temperature, the precipitated yellow product is filtered off and washed successively with 2-phenylethyl alcohol, methanol and water and dried at 70° C in vacuo. The dye can be further purified by recrystallisation from 1,2-dichlorobenzene. It has the formula

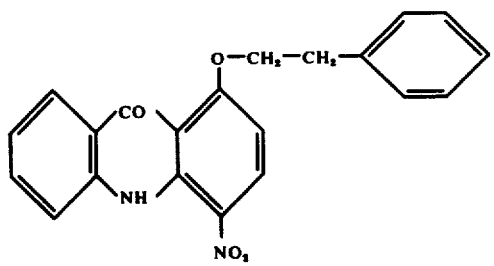

and in aqueous dispersion in the presence of sodium orthophenylphenolate dyes polyethylene glycol terephthalate fibres in bright, greenish yellow shades. The dyeings are of very good fastness to washing, rubbing, light and sublimation.

Dyes of similarly good fastness properties are obtained by using equal amounts of benzyl alcohol or 3-phenylpropanol instead of the 140 ml of 2-phenylethanol and otherwise carrying out the same procedure.

EXAMPLE 7

2 g of the dye obtained according to Example 1 are dispersed in 4,000 g of water. To this dispersion are then added as swelling agent 12 g of the sodium salt of p-phenylphenol as well as 12 g of diammonium phosphate and 100 g of polyethylene glycol terephthalate yarn are dyed in this bath for 1/ hours at 95°–98° C. The dyed goods are rinsed with water and given an aftertreatment with dilute aqueous sodium hydroxide solution and a dispersant. A greenish yellow dyeing which is fast to washing, light and sublimation is obtained. A greenish yellow dyeing of very good fastness to washing and sublimation is also obtained by substituting in this Example 100 g of cellulose triacetate fabric for the polyethylene glycol terephthalate yarn, dyeing under the given conditions and then rinsing the goods with water.

EXAMPLE 8

In a pressure dyeing apparatus, 2 g of the dye obtained according to Example 3 are finely dispersed in 2,000 g of water which contains 4 g of oleyl polyglycol ether. The pH of the dyebath is adjusted to 6–6.5 with acetic acid. Then 100 g of polyethylene glycol terephthalate fabric are then put into this dyebath at 50° C. The bath is heated over the course of 30 minutes to 130° C and the fabric is dyed for 50 minutes at this temperature. The dyeing is subsequently rinsed, soaped, and dried. A reddish yellow dyeing which is fast to washing, perspiration, light and sublimation is obtained under these conditions.

EXAMPLE 9

Polyethylene glycol terephthalate fabric (e.g. that made by E. I. Dupont de Nemours, Wilmington, DE, U.S.A., under the registered trademark "Dacron") is impregnated on a padder at 40° C with a liquor of the following composition: 20 g of the dye according to Example 2 finely dispersed in 7.5 g of sodium alginate, 20 g of triethanolamine, 20 g of octylphenol-polyglycol ether and 900 g of water.

The fabric, which is squeezed out to a pick-up of about 100% (referred to the dry weight), is dried at 100° C and subsequently fixed for 30 seconds at a temperature of 210° C. The dyed goods are rinsed with water, soaped and dried. A greenish yellow dyeing which is fast to washing, rubbing, light and sublimation is obtained under these conditions.

We claim:
1. A disperse dye of the formula

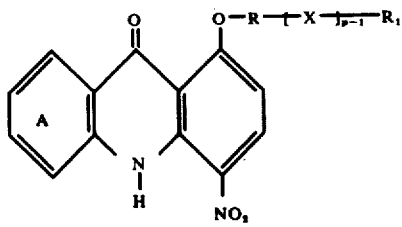

wherein $p$ is 1 or 2, R is a straight-chain alkylene of 2 to 4 carbon atoms which may be interrupted by sulphur or oxygen atoms or a branched alkylene of 2 to 4 carbon atoms which is unsubstituted or substituted by hydroxy, $R_1$ is phenyl or phenyl substituted by $C_1$–$C_4$-alkyl, $C_1$–$C_2$-alkoxy, halogen, phenyl, trifluoromethyl or lower carbalkoxy, X is oxygen or sulphur atom, the rings A and B can carry further non-ionic substituents selected from the group consisting of $C_1$–$C_4$-alkyl, $C_1$–$C_2$-alkoxy, halogen, alkylthio, nitro, cyano, trifluoromethyl, phenoxy, phenyl or acetamido, and the ring A can carry a further fused benzo ring.

2. A dye according to claim 1, wherein $p$ is 1.
3. A dye according to claim 1, wherein $p$ is 2.
4. A dye according to claim 1, wherein the radical R is a straight-chain or a branched alkylene chain of 2 to 4 carbon atoms.
5. A dye according to claim 4, wherein the radical R has the formula —$(CH_2)_{2-4}$—.
6. A dye according to claim 4, wherein $R_1$ is phenyl or phenyl substituted by $C_1$–$C_4$-alkyl, chlorine, methoxy, ethoxy, phenyl or trifluoromethyl.
7. A dye according to claim 1, wherein the ring A contains chlorine and bromine atoms, methyl, ethyl, isopropyl, tert. butyl, phenyl, methoxy, ethoxy, phenoxy, methylmercapto, acetamido, nitro and benzo radicals (the latter in 6,7- or 7,8 position) or is unsubstituted.
8. A dye according to claim 5 of the formula

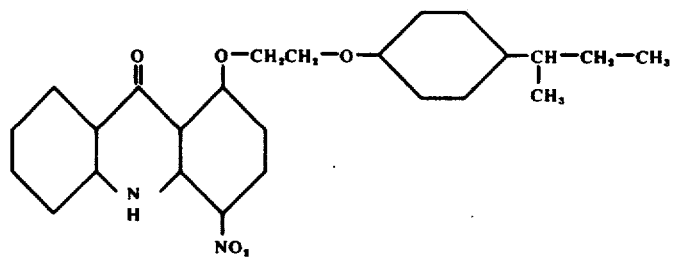
9. A dye according to claim 5 of the formula
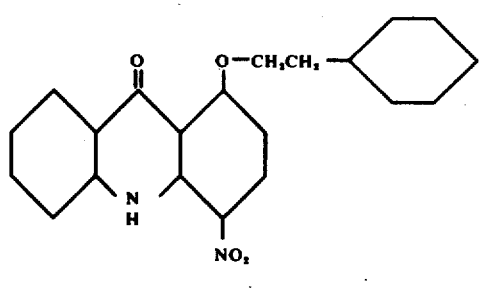
10. A dye according to claim 5 of the formula
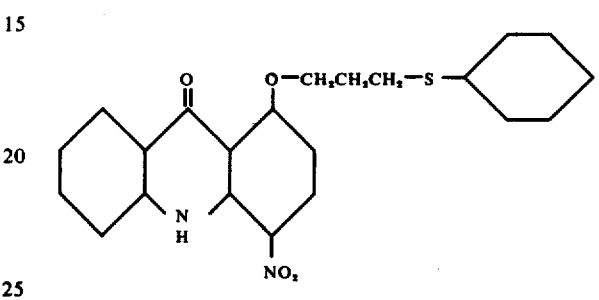
* * * * *